(12) United States Patent
Kismarton et al.

(10) Patent No.: US 7,776,176 B2
(45) Date of Patent: Aug. 17, 2010

(54) PROCESS FOR MARKING COMPOSITE PANEL

(75) Inventors: Max U. Kismarton, Renton, WA (US); Dusty Dequine, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 136 days.

(21) Appl. No.: 11/848,609

(22) Filed: Aug. 31, 2007

(65) Prior Publication Data

US 2009/0061144 A1    Mar. 5, 2009

(51) Int. Cl.
| | |
|---|---|
| C08J 5/00 | (2006.01) |
| B29C 65/56 | (2006.01) |
| B32B 37/02 | (2006.01) |
| B32B 37/24 | (2006.01) |
| B32B 38/04 | (2006.01) |
| B32B 38/08 | (2006.01) |
| B29C 65/64 | (2006.01) |
| B29C 65/78 | (2006.01) |
| B32B 37/28 | (2006.01) |
| B32B 38/18 | (2006.01) |

(52) U.S. Cl. ............... 156/298; 156/277; 156/285; 156/307.1; 156/307.3

(58) Field of Classification Search ............... 156/277, 156/298, 307.1–307.7, 285
See application file for complete search history.

(56) References Cited

U.S. PATENT DOCUMENTS

| | | | | |
|---|---|---|---|---|
| 4,951,970 | A | * | 8/1990 | Burt ............................ 283/67 |
| 5,066,349 | A | * | 11/1991 | Perko et al. ................. 156/166 |
| 5,968,445 | A | * | 10/1999 | McCarville et al. ......... 264/571 |
| 6,013,154 | A | * | 1/2000 | Thomas-Cote ............. 156/277 |
| 7,575,194 | B2 | | 8/2009 | Brown et al. |
| 2006/0231199 | A1 | * | 10/2006 | Weng et al. ................. 156/285 |
| 2008/0128553 | A1 | | 6/2008 | Brown et al. |
| 2008/0210820 | A1 | | 9/2008 | Kismarton et al. |

* cited by examiner

*Primary Examiner*—Philip C Tucker
*Assistant Examiner*—Sonya Mazumdar
(74) *Attorney, Agent, or Firm*—Tung & Associates

(57) ABSTRACT

A process for marking a composite panel prior to curing for subsequent identification. An illustrative embodiment of the process includes applying a label strip made of a resin-permeable material to a composite panel formed of a resin and curing the panel to an elevated temperature such that the resin at least partially permeates the label strip. A marked composite panel is also disclosed.

21 Claims, 7 Drawing Sheets

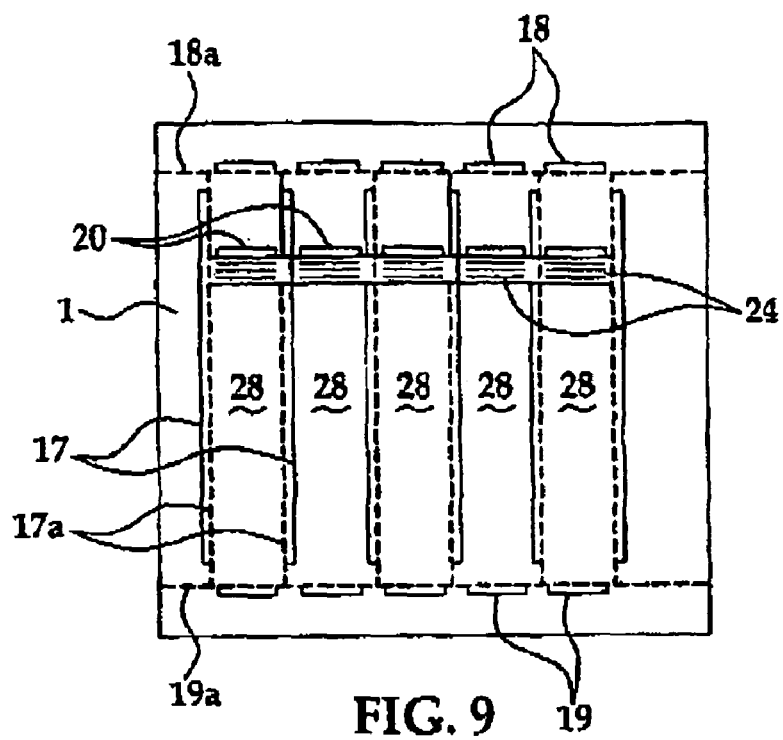
FIG. 9
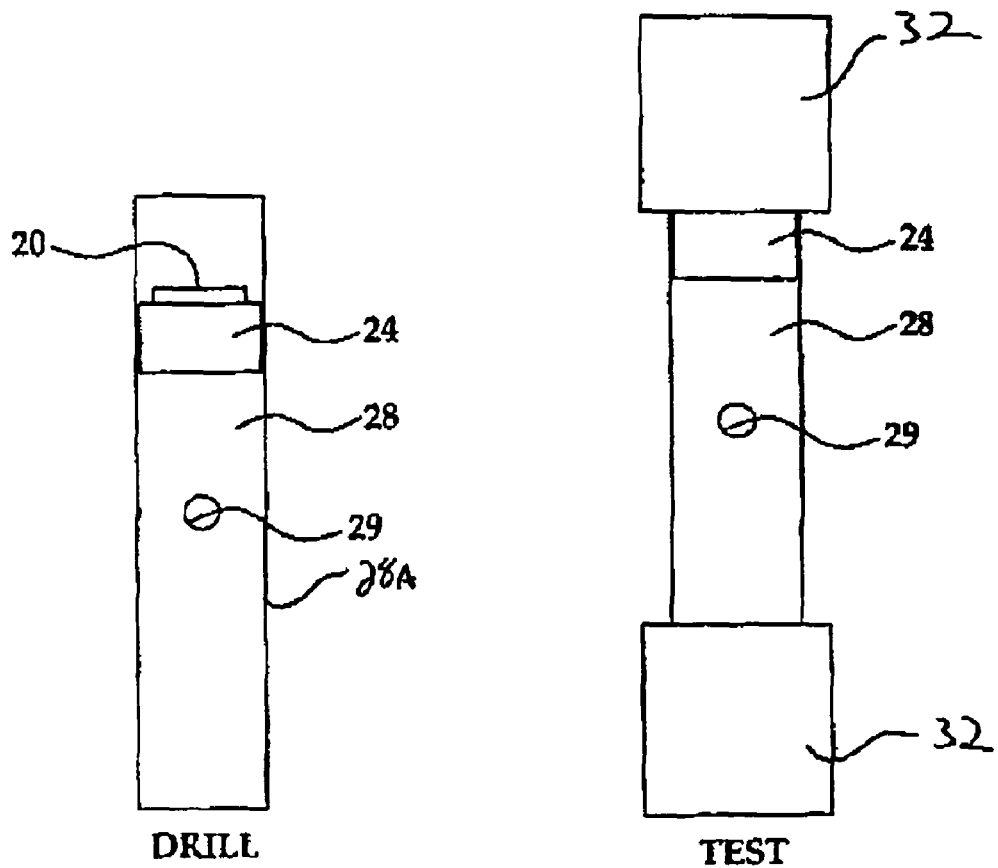
DRILL
FIG. 10
TEST
FIG. 11

PROCESS FOR MARKING COMPOSITE PANEL

TECHNICAL FIELD

The disclosure generally relates to test coupons. More particularly, the disclosure relates to a process for marking a composite panel in which label strips become a part of the composite panel from which test coupons are fabricated.

BACKGROUND

The traditional test coupon labeling method includes painting of labels on the panels by hand prior to sectioning of the test coupons from a larger panel. Because technicians may hand-label hundreds of similar coupons with often verbose coded language, mistakes may be unavoidable. Therefore, the painted labels are typically sent to Quality Assurance (QA) for double-checking. However, the painted labels may be washed off by cutting fluids or may be damaged during handling, potentially rendering the labels unreadable during testing.

SUMMARY

The disclosure is generally directed to a process for marking a composite panel prior to curing for subsequent identification. An illustrative embodiment of the process includes applying a label strip made of a resin-permeable material to a composite panel formed of a resin and curing the panel to an elevated temperature such that the resin at least partially permeates the label strip.

The disclosure is further generally directed to a marked composite panel. An illustrative embodiment of the marked composite panel includes a composite panel formed of a resin and at least one resin-permeable label strip formed into the composite panel. The resin of the composite panel at least partially permeates the at least one resin-permeable label strip.

BRIEF DESCRIPTION OF THE ILLUSTRATIONS

FIG. 9 is a top view of the composite panel, with multiple cutting lines provided along the respective scribe lines in the composite panel.

FIG. 10 is a front view of a coupon cut from the composite panel, with a label strip provided on the coupon.

FIG. 11 is a front view of a coupon, with a pair of grips provided on the coupon preparatory to testing.

DETAILED DESCRIPTION

Figure 1:
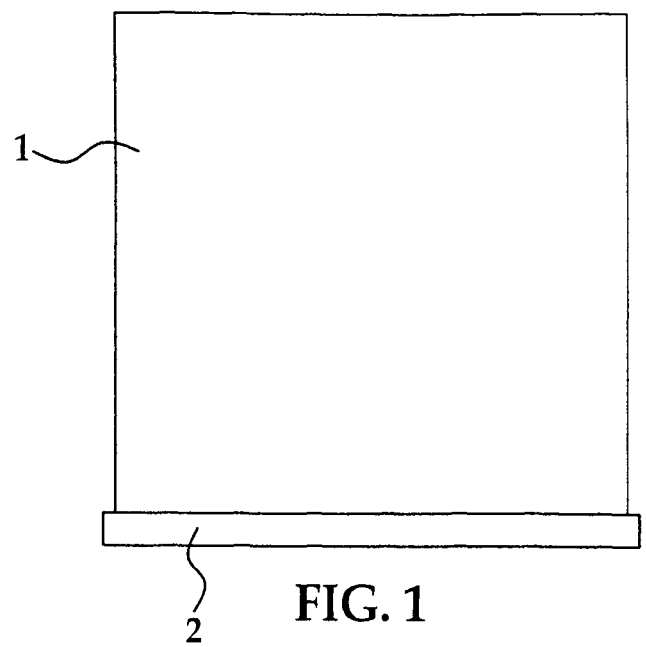
FIG. 1 is a top view of a composite panel.

Referring initially to FIGS. 1-11, 15 and 16, an illustrative embodiment of the composite coupon labeling process, hereinafter process, is shown. As shown in FIG. 1, the process includes providing a composite panel 1 which may be laminated and have a selected number of plies at any of various orientations and sequences. The composite panel 1 may have a fixed straight edge 2. The fixed straight edge 2 is useful in precisely orienting and locating the plies of the composite panel 1.

Figure 2:
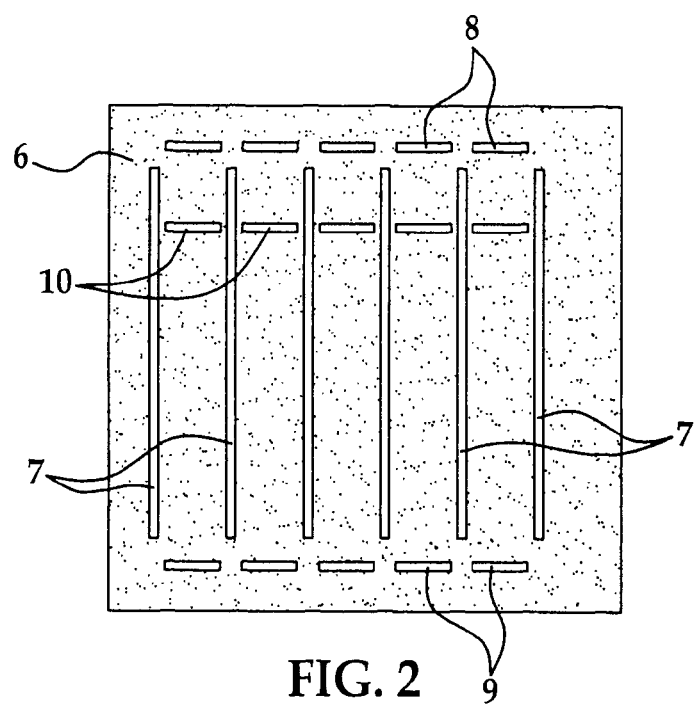
FIG. 2 is a top view of a template, placed on the composite panel (not shown).
Figure 3:
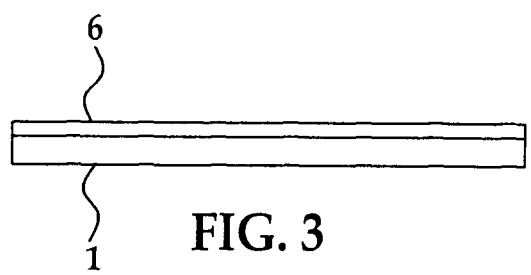
FIG. 3 is an edge view of the template placed on the composite panel.

As shown in FIGS. 2 and 3, a scribing template 6 may be placed on the composite panel 1. Edges 6a of the scribing template 6 may be used to orient the scribing template 6 on the composite panel 1. The scribing template 6 may be, for example and without limitation, a 0.030" aluminum sheet. Multiple longitudinal scribe slots 7 may extend through the scribing template 6 in generally parallel, spaced-apart relationship with respect to each other. A first set of transverse scribe slots 8 may extend through the scribing template 6, to one end of and generally between the adjacent longitudinal scribe slots 7. Each of the first set of transverse scribe slots 8 may be oriented in generally perpendicular relationship with respect to each longitudinal scribe slot 7. A second set of transverse scribe slots 9 may extend through the scribing template 6, to the other end of and generally between the adjacent longitudinal scribe slots 7. Each of the second set of transverse scribe slots 9 may be oriented in generally perpendicular relationship with respect to each longitudinal scribe slot 7.

The longitudinal scribe slots 7, the first set of transverse scribe slots 8 and the second set of transverse scribe slots 9 may define respective edges of test coupons 28 (FIG. 5) which will subsequently be cut out of the composite panel 1. The layout of the longitudinal scribe slots 7 and the transverse scribe slots 8 and 9 which will ultimately form the edges 28a of the test coupons 28 may be generated using a CAD system at 0.13 inch or other spacing to allow for the kerf of a diamond saw that may be used to cut the composite panel 1 into the test coupons 28. Multiple label-positioning scribe slots 10 may extend through the scribing template 6, between the adjacent longitudinal scribe slots 7 and in generally parallel, spaced-apart relationship with respect to the respective ones of the first set of transverse scribe slots 8. The longitudinal scribe slots 7, the first set of transverse scribe slots 8, the second set of transverse scribe slots 9 and the label-positioning scribe slots 10 may be without limitation water jet-machined in the scribing template 6, for example.

Figure 4:
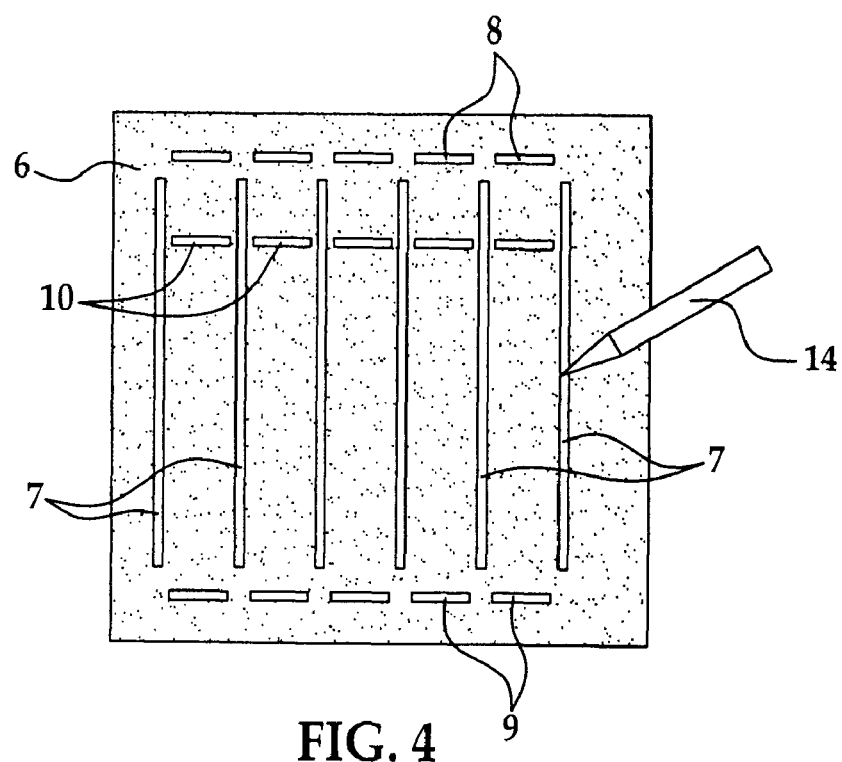
FIG. 4 is a top view of the template, more particularly illustrating drawing of multiple scribe lines and label-positioning lines on the adjacent composite panel using a marking implement.
Figure 5:
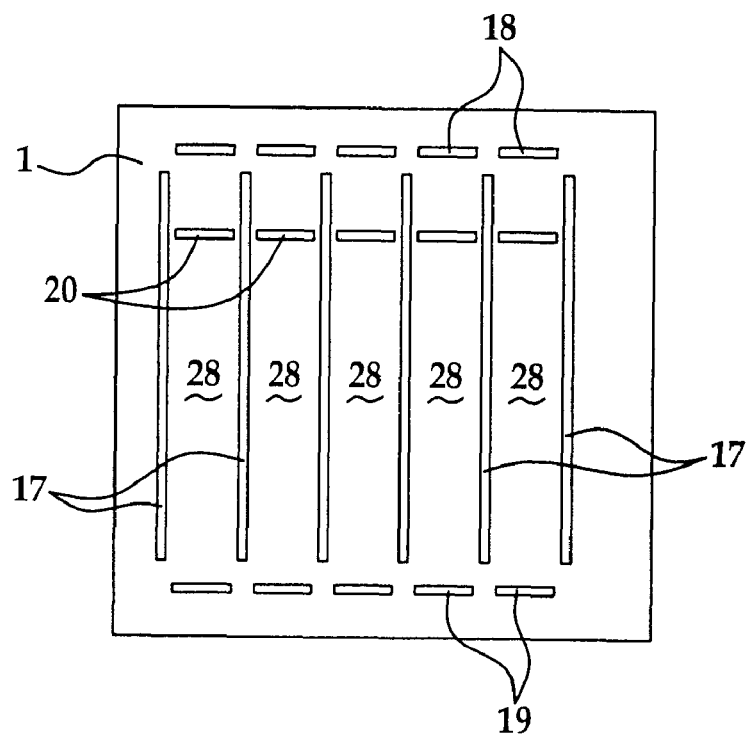
FIG. 5 is a top view of the composite panel, with multiple scribe lines and label-positioning lines drawn thereon.

As shown in FIGS. 4 and 5, a marking implement 14 (FIG. 4) may be extended through and along each longitudinal scribe slot 7 to draw longitudinal scribe lines 17 on the composite panel 1. In similar manner, the marking implement 14 may be extended through and along each of the first set of transverse scribe slots 8; each of the second set of transverse scribe slots 9; and each label-positioning slot 10 to draw a first set of transverse scribe lines 18; a second set of transverse scribe lines 19; and label-positioning lines 20, respectively, on the composite panel 1. The marking implement 14 may be, for example and without limitation, a silver marking pencil. After the first set of transverse scribe lines 18, the second set of transverse scribe lines 19 and the label-positioning lines 20 may be drawn on the composite panel 1. The scribing template 6 may then be removed from the composite panel 1, as shown in FIG. 5.

Figure 6:
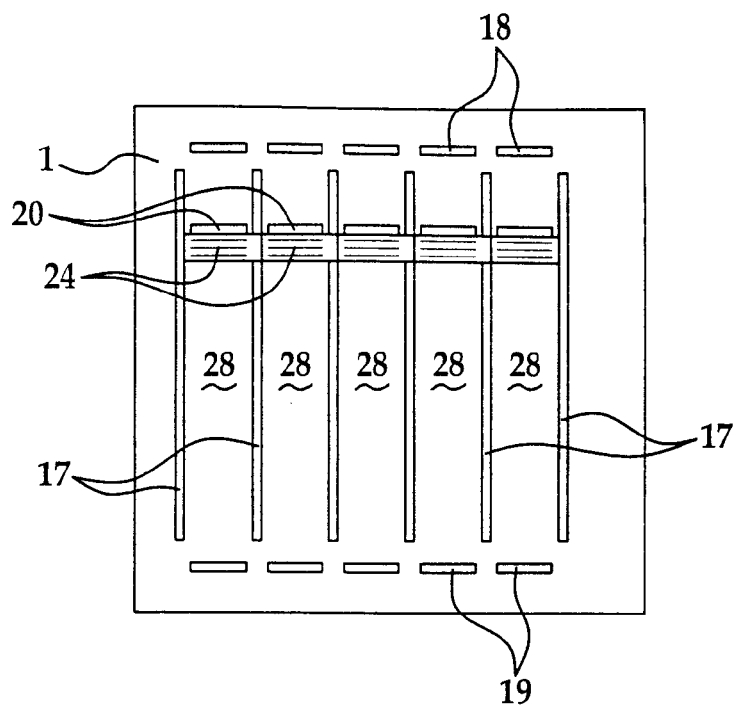
FIG. 6 is a top view of the composite panel, with multiple label strips placed on the composite panel.

As shown in FIG. 6, multiple label strips 24 may be provided on the composite panel 1. Each label strip 24 may be provided between each corresponding pair of adjacent longitudinal scribe lines 17, along and adjacent to the corresponding label-positioning line 20. Side edges of each label strip 24 may be generally aligned with the respective longitudinal scribe lines 17. Identifying indicia (not numbered) may be provided on each label strip 24 to identify each of multiple test coupons which will be subsequently cut from the composite panel 1 along the longitudinal scribe lines 17, the first set of transverse scribe lines 18 and the second set of transverse scribe lines 19, as will be hereinafter described.

The label strips 24 and any identifying indicia thereon may be printed to proper dimensions (such as size 10-14 font, for example) on 11×17 sheets of a resin-permeable material such as paper using an EXCEL spreadsheet, for example, and cut from the sheet of paper. Printing of the identifying indicia on the label strips 24 serializes the identifying indicia of the label strips 24 while eliminating mistakes. Moreover, printing of the identifying indicia on the label strips 24 prevents smudging and illegibility which are common characteristics of hand-printing. The identifying indicia which are provided on each label strip 24 may include custom bar codes to expedite identification. The label strips 24 may be attached to the composite layer 1 according to any suitable technique which is known to those skilled in the art. For example, the label strips 24 may be affixed to the composite layer 1 by the application of heat and manual pressure.

Figure 7:
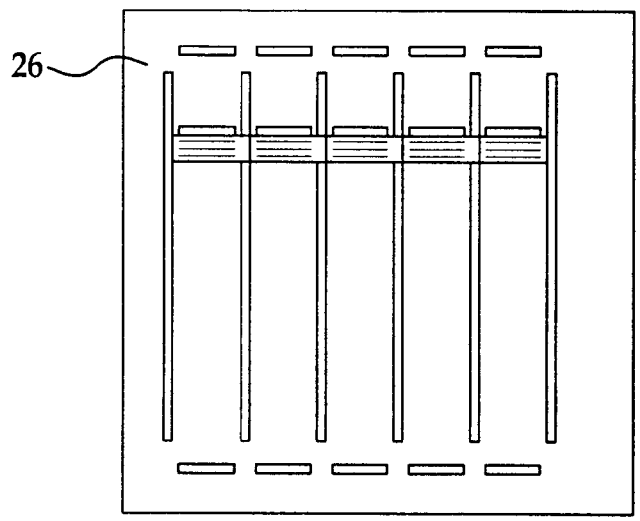
FIG. 7 is a top view of a caul plate, placed on the composite panel (not shown).
Figure 8:
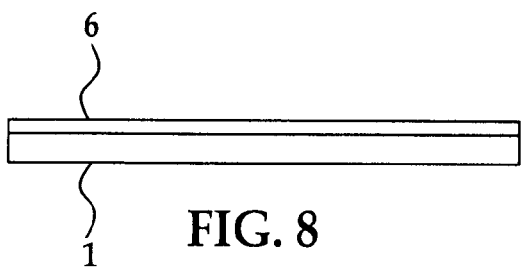
FIG. 8 is an edge view of the caul plate placed on the composite panel.
Figure 15:
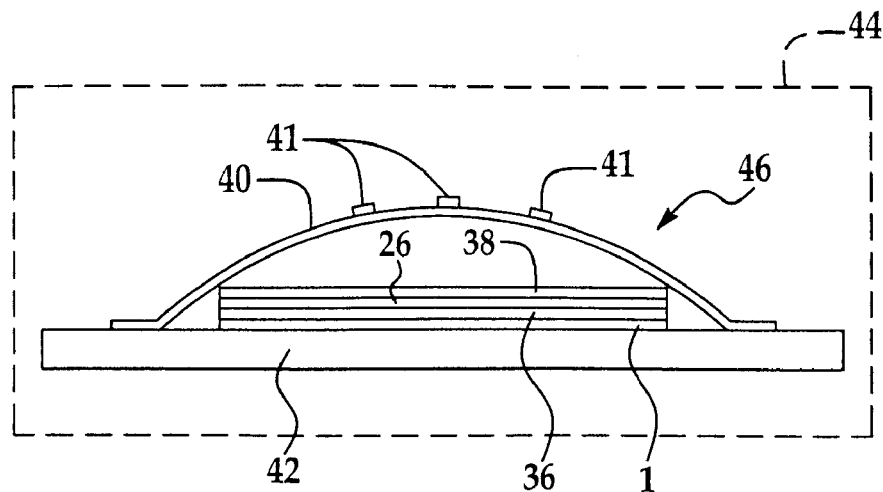
FIG. 15 is a schematic diagram illustrating an exemplary process for curing of a composite panel.
Figure 16:
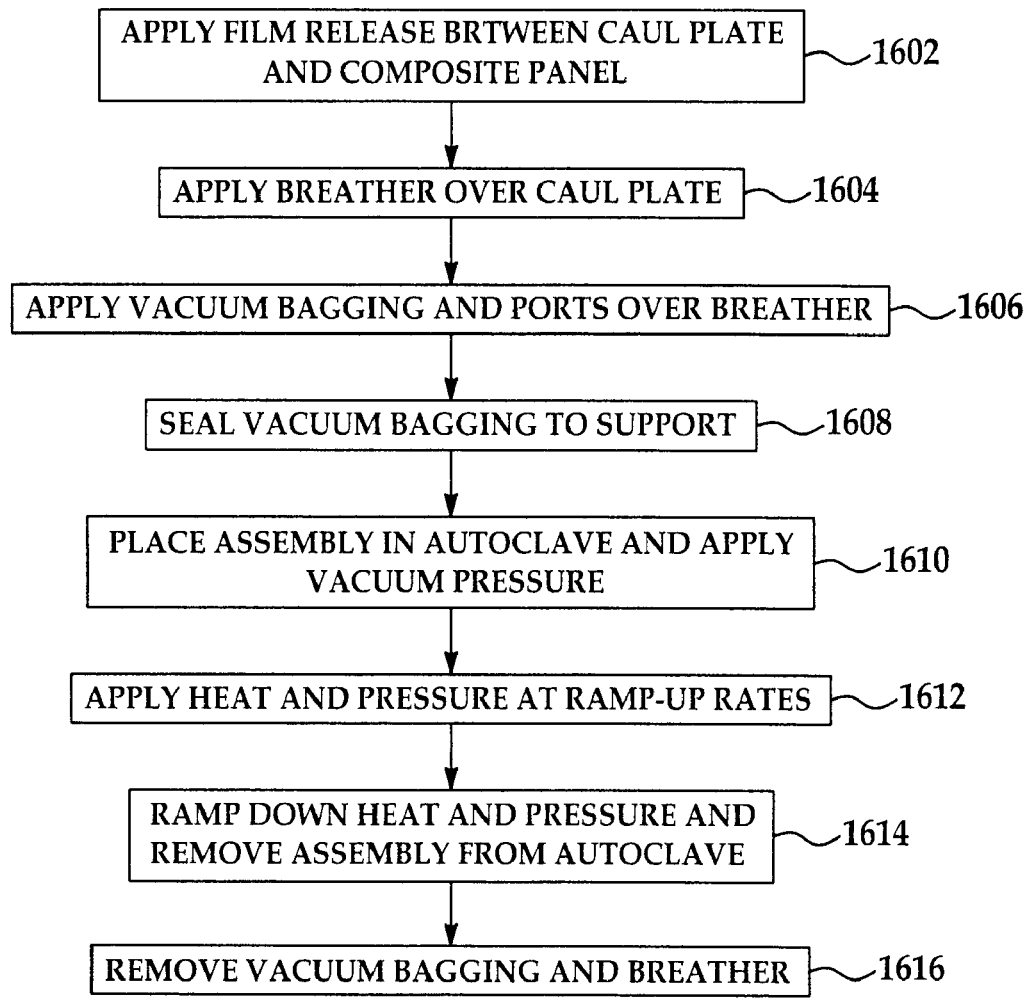
FIG. 16 is a block diagram illustrating an exemplary process for curing of a composite panel.

As shown in FIGS. 7 and 8, a caul plate 26 may be placed on the composite panel 1 for curing purposes. The caul plate 26 may be without limitation a 0.125" aluminum caul plate, for example. The composite panel 1 with the caul plate 26 placed thereon may then be cured. An exemplary curing process is shown in FIG. 15 and in block diagram form in FIG. 16. The process includes (1) applying a film release 36 between the caul plate 26 and the composite panel 1, as shown in FIG. 15 and indicated in block 1602 in FIG. 16; (2) applying a breather 38 over the caul plate 26 (block 1604); (3) applying vacuum bagging 40 and ports 41 over the breather 38 (block 1606); (4) sealing the vacuum bagging 40 and ports 41 to a support 42 such as a plate or table on which the composite panel 1 is to be cured (block 1608); (5) placing the assembly 46 in an autoclave 44 and applying vacuum pressure (block 1610); applying heat and pressure at ramp-up rates, pausing at the gel temperature of the resin and venting to atmosphere if necessary (block 1612); (6) ramping down heat and pressure and removing the assembly 46 from the autoclave 44 (block 1614); and (8) removing the vacuum bagging 40 and ports 41 and breather 38. During the curing process, resin may soak into the typical paper label strips 24, rendering the label strips 24 a permanent or integral part of the composite panel 1 and resistant or impervious to solvents, abrasion, rubbing, smudging, etc.

As shown in FIG. 9, individual test coupons 28 may be cut from the composite panel 1 by sawing the composite panel 1 along longitudinal cutting lines 17a and transverse cutting lines 18a and 19a, respectively. The longitudinal cutting lines 17a may generally coincide with the respective longitudinal scribe lines 17, whereas the transverse cutting lines 18a and 19a may generally coincide with the respective first set of transverse scribe lines 18 and second set of transverse scribe lines 19. The label strips 24 remain on the respective test coupons 28. Therefore, each test coupon 28 typically does not require individual additional labeling.

As illustrated in FIG. 10, a coupon opening 29 may be drilled in each test coupon 28. The coupon opening 29 may extend through generally the center of the test coupon 28. Test coupons 28 may be drilled in stacks of up to five (5) without deterioration of the coupon opening 29, provided a carbon backing (not shown) is used.

As illustrated in FIG. 11, a grip 32 may be provided on each end of each test coupon 28 for testing purposes. The label strip 24 may be positioned in such a manner that each grip 32 does not interfere with reading of the label strip 24. Each test coupon 28 may be subjected to testing in the conventional manner.

Figure 12:
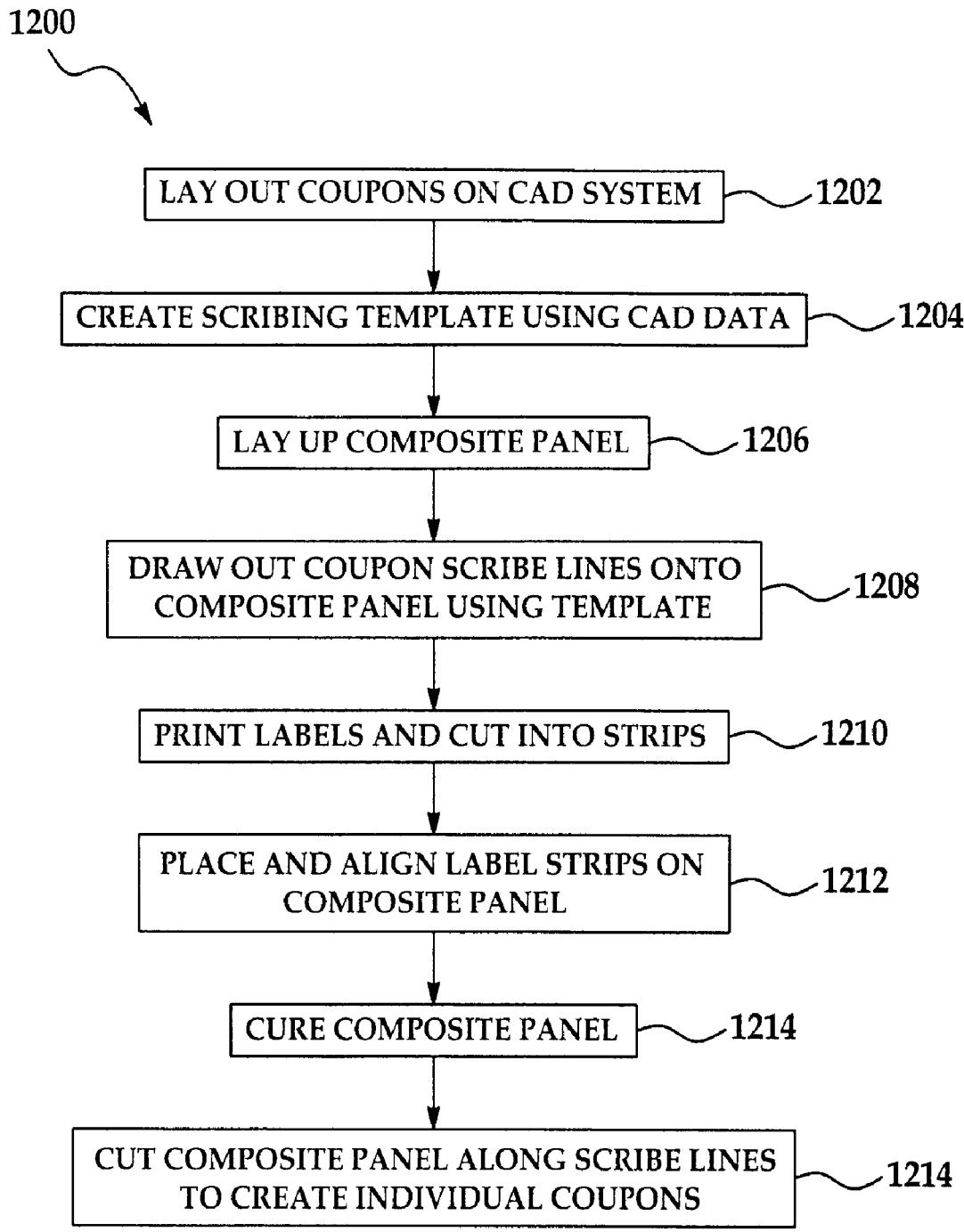
FIG. 12 is a flow diagram showing an illustrative embodiment of the composite panel marking process.

Referring next to FIG. 12, a flow diagram 1200 which summarizes an illustrative embodiment of the composite coupon labeling process is shown. In block 1202, a layout of the test coupons may be generated using a CAD system. In block 1204, a scribing template may be created using the CAD data obtained in block 1202. In block 1206, a composite panel may be laid up. In block 1208, coupon scribe lines may be drawn out or traced onto the composite panel using the scribing template. In block 1210, labels may be printed and then cut into strips. In block 1212, the label strips may be placed and aligned on the composite panel. In block 1214, the composite panel may be cured. In block 1216, the composite panel may be cut along the scribe lines to create individual coupons.

Figure 13:
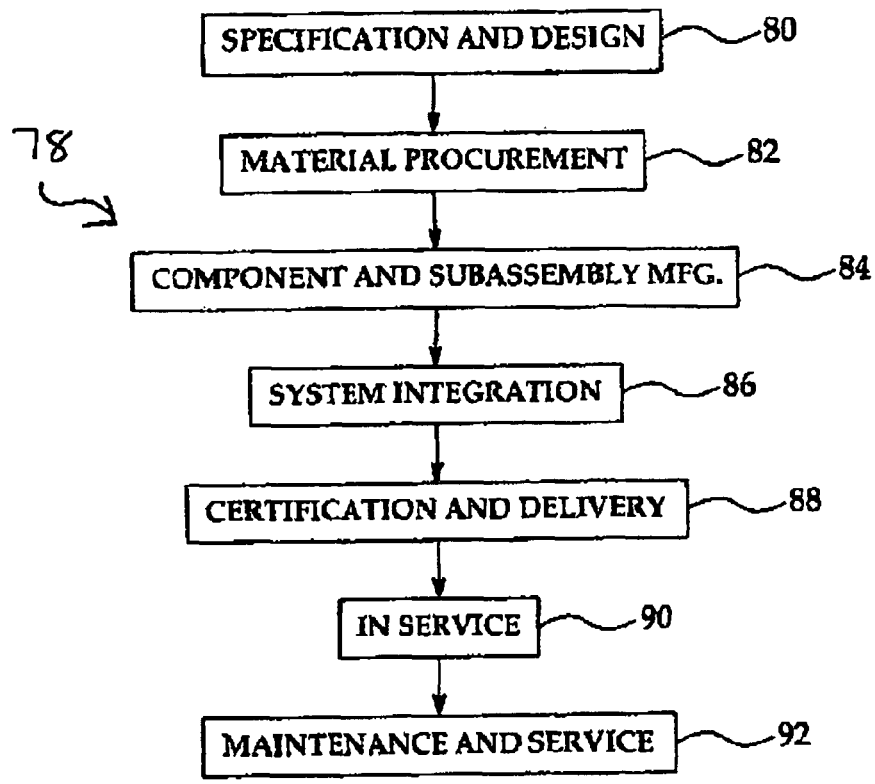
FIG. 13 is a flow diagram of an aircraft production and service methodology.
Figure 14:
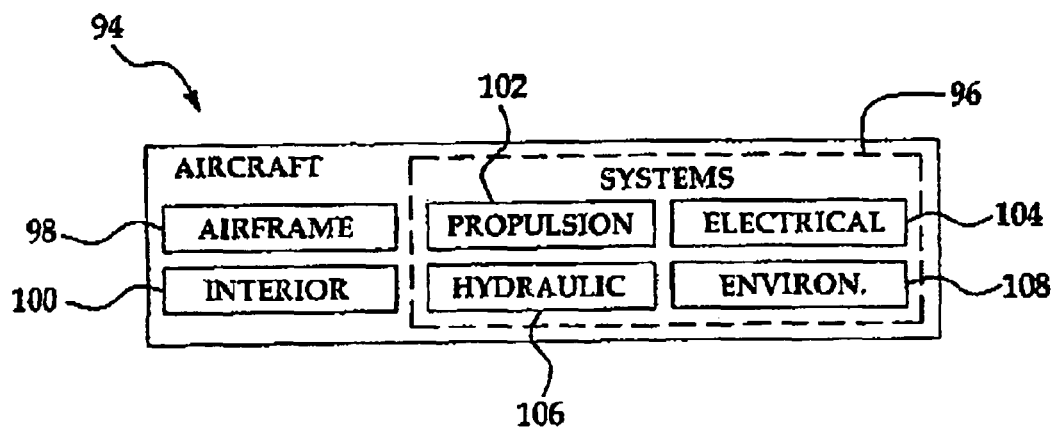
FIG. 14 is a block diagram of an aircraft.

Referring next to FIGS. 13 and 14, embodiments of the disclosure may be used in the context of an aircraft manufacturing and service method 78 as shown in FIG. 13 and an aircraft 94 as shown in FIG. 14. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 90 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 94 produced by exemplary method 78 may include an airframe 98 with a plurality of systems 96 and an interior 100. Examples of high-level systems 96 may include one or more of a propulsion system 102, an electrical system 104, a hydraulic system 106, and an environmental system 108. Any number of other systems may be included. Although an aerospace example is shown, the principles of the disclosure may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A process for marking a composite panel prior to curing for subsequent identification, comprising the steps of:
    applying a label strip made of material that is permeable to a resin of a composite panel formed of said resin; creating a layout of test coupons; said applying step comprises applying a plurality of said label strip to said layout of test coupons;
    fabricating a scribing template from said layout;
    using said scribing template to locate said layout of said test coupons on said composite panel;
    said layout of said test coupons comprises using a plurality of scribe lines tracing said layout onto said composite panel by a marking implement;
    curing said composite panel to produce a cured composite panel, said curing including;
    surrounding said composite panel during said curing with vacuum bagging and applying vacuum to said composite panel; and
    at least partially permeating said label strip with said resin.

2. The process of claim 1 wherein said composite panel comprises a laminated composite panel.

3. The process of claim 1 wherein said plurality of scribe lines comprises a plurality of longitudinal scribe lines and a plurality of transverse scribe lines.

4. The process of claim 3 wherein said plurality of transverse scribe lines comprises a first set of transverse scribe lines provided at a first end of said plurality of longitudinal scribe lines and a second set of transverse scribe lines provided at a second end of said plurality of longitudinal scribe lines.

5. The process of claim 1 wherein said layout of said test coupons comprises a plurality of label-positioning lines and said applying a plurality of said label strips to said test coupons, respectively, comprises applying said label strips to said panel along said plurality of label-positioning lines, respectively.

6. The process of claim 1 wherein said marking implement comprises a silver marking pencil.

7. The process of claim 1 wherein said step of curing said composite panel comprises applying heat to said composite panel.

8. A process for marking a composite test panel prior to curing for subsequent identification, comprising the steps of:
    creating a layout of test coupons;
    fabricating a scribing template from said layout by forming a plurality of scribe slots corresponding to said layout of said test coupons in said scribing template;
    tracing said layout of said test coupons onto a composite panel formed of a resin, said tracing through said plurality of scribe slots using a marking implement;
    applying label strips made of a resin-permeable material to said composite panel;
    curing said composite panel such that said resin at least partially permeates said label strips; and
    cutting said test coupons from said composite panel according to said layout of said test coupons.

9. The process of claim 8 wherein said composite panel comprises a laminated composite panel.

10. The process of claim 8 wherein said layout of said test coupons comprises a plurality of scribe lines corresponding to said plurality of scribe slots, respectively, of said scribing template.

11. The process of claim 10 wherein said plurality of scribe lines comprises a plurality of longitudinal scribe lines and a plurality of transverse scribe lines.

12. The process of claim 11 wherein said plurality of transverse scribe lines comprises a first set of transverse scribe lines provided at a first end of said plurality of longitudinal scribe lines and a second set of transverse scribe lines provided at a second end of said plurality of longitudinal scribe lines.

13. The process of claim 8 wherein said layout of said test coupons comprises a plurality of label-positioning lines and said applying label strips to said composite panel comprises applying said label strips to said composite panel along said plurality of label-positioning lines, respectively.

14. The process of claim 8 wherein said marking implement comprises a silver marking pencil.

15. The process of claim 8 wherein said step of curing said composite panel comprises applying heat to said composite panel.

16. A process for marking a composite test panel prior to curing for subsequent identification, comprising the steps of:
    creating a layout of test coupons;
    said layout of said test coupons comprises a plurality of generally elongated, parallel, spaced-apart longitudinal scribe lines and first and second sets of transverse scribe lines provided at first and second ends, respectively, of said plurality of longitudinal scribe lines;
    said layout of said test coupons further comprises a plurality of label-positioning lines extending between adjacent ones of said plurality of longitudinal scribe lines, respectively;
    fabricating a scribing template from said layout by providing a plurality of longitudinal scribe slots, first and second sets of transverse scribe slots and a plurality of label-positioning slots corresponding to said plurality of longitudinal scribe lines, said first and second sets of transverse scribe lines and said plurality of label-positioning lines, respectively, in said scribing template;
    using said scribing template to locate said layout of said test coupons on said panel by tracing said plurality of longitudinal scribe lines, said first and second sets of transverse scribe lines and said plurality of label-positioning lines onto said composite panel through said plurality of longitudinal scribe slots, said first and second sets of transverse scribe slots and said label-positioning slots, respectively, in said scribing template using a marking implement;
    applying label strips made of a resin-permeable material to said composite panel along said plurality of label-positioning lines, respectively;
    curing said composite panel, said curing comprising applying heat to said composite panel such that said resin at least partially permeates said label strips; and
    preparing said test coupons from said composite panel by cutting said composite panel along said scribe lines.

17. The process of claim 16 wherein said composite panel comprises a laminated composite panel.

18. The process of claim 16 wherein said marking implement comprises a silver marking pencil.

19. The process of claim 16 wherein each of said label strips comprises paper.

20. The process of claim 8 wherein said curing comprises surrounding said composite panel with vacuum bagging and applying vacuum to said composite panel during said curing process.

21. The process of claim 16 wherein said curing further comprises surrounding said composite panel with vacuum bagging and applying vacuum to said composite panel during said curing process.

* * * * *